(12) United States Patent
Wilkinson et al.

(10) Patent No.: US 9,306,727 B2
(45) Date of Patent: Apr. 5, 2016

(54) SYSTEM AND METHOD FOR SYNCHRONIZING GROUND CLOCKS

(71) Applicant: Raytheon Company, Waltham, MA (US)

(72) Inventors: Steven R. Wilkinson, Stevenson Ranch, CA (US); Ulvi Yurtsever, Altadena, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/337,675

(22) Filed: Jul. 22, 2014

(65) Prior Publication Data

US 2016/0028535 A1    Jan. 28, 2016

(51) Int. Cl.
*H04L 7/00* (2006.01)
*H04B 7/185* (2006.01)

(52) U.S. Cl.
CPC .......... *H04L 7/0012* (2013.01); *H04B 7/18515* (2013.01); *H04B 7/18517* (2013.01); *H04B 7/18519* (2013.01)

(58) Field of Classification Search
CPC ........................................................ H03L 7/06
USPC ......................................................... 375/356
See application file for complete search history.

(56) References Cited

U.S. PATENT DOCUMENTS

| | | | |
|---|---|---|---|
| 2001/0030625 A1* | 10/2001 | Doles et al. ................... | 342/387 |
| 2002/0059535 A1 | 5/2002 | Bekritsky et al. | |
| 2002/0114405 A1* | 8/2002 | Sindhushayana et al. .... | 375/316 |
| 2008/0158060 A1* | 7/2008 | Lee et al. ...................... | 342/450 |
| 2012/0155584 A1 | 6/2012 | Wilkinson et al. | |
| 2012/0177027 A1 | 7/2012 | Venkatraman et al. | |

FOREIGN PATENT DOCUMENTS

| | | |
|---|---|---|
| WO | WO-9813969 A1 | 4/1998 |
| WO | WO-0180461 A1 | 10/2001 |

OTHER PUBLICATIONS

"International Application Serial No. PCT/US2015/041255, International Search Report mailed Oct. 22, 2015", 6 pgs.
"International Application Serial No. PCT/US2015/041255, Written Opinion mailed Oct. 22, 2015", 5 pgs.

* cited by examiner

*Primary Examiner* — Lihong Yu
(74) *Attorney, Agent, or Firm* — Schwegman Lundberg & Woessner, P.A.

(57) ABSTRACT

A system and method of synchronizing clocks within a system having a plurality of base stations, wherein each base station includes a frequency locked clock. A fast moving emitter transmits pulses that are received at each base station. A time of arrival for each pulse received by each base station is recorded and the recorded times of arrival are communicated to at least one of the other base stations. The clocks are synchronized as a function of the recorded times of arrival received from each base station.

18 Claims, 5 Drawing Sheets

$$t_{Ai1} = t_i + \frac{1}{c}|\vec{r}_i - \vec{R}_1|$$

$$t_{Ai2} = t_i + \frac{1}{c}|\vec{r}_i - \vec{R}_2| + \Delta T_2 \quad i = 1,2,\ldots,k$$

$$\ldots$$

$$t_{Aip} = t_i + \frac{1}{c}|\vec{r}_i - \vec{R}_p| + \Delta T_p \quad i = 1,2,\ldots,k$$

$$\ldots$$

$$t_{AiN} = t_i + \frac{1}{c}|\vec{r}_i - \vec{R}_N| + \Delta T_N \quad i = 1,2,\ldots,k$$

*FIG. 2*

$$t_{Ai1} = t_0 + i\delta + \frac{1}{c}|\vec{r}_i - \vec{R}_1| \qquad i = 1, 2, \ldots, k$$

$$t_{Ai2} = t_0 + i\delta + \frac{1}{c}|\vec{r}_i - \vec{R}_1 - \vec{D}_{12}| + \Delta T_2 \qquad i = 1, 2, \ldots, k$$

$$\vdots$$

$$t_{Aip} = t_0 + i\delta + \frac{1}{c}|\vec{r}_i - \vec{R}_1 - \vec{D}_{1p}| + \Delta T_p \qquad i = 1, 2, \ldots, k$$

$$\vdots$$

$$t_{AiN} = t_0 + i\delta + \frac{1}{c}|\vec{r}_i - \vec{R}_1 - \vec{D}_{1N}| + \Delta T_N \qquad i = 1, 2, \ldots, k$$

*FIG. 3*

$$t_{Ai1} = t_0 + i\delta + \frac{1}{c}|\vec{r}_i + \vec{\beta}_i(\lambda_1, \lambda_2, \ldots, \lambda_p) + \vec{\varepsilon}_i - \vec{R}_1| + \kappa_{i1}(\mu_1, \mu_2, \ldots, \mu_s) + \zeta_{i1} + \gamma_1 \qquad i = 1, 2, \ldots, k$$

$$t_{Ai2} = t_0 + i\delta + \frac{1}{c}|\vec{r}_i + \vec{\beta}_i(\lambda_1, \lambda_2, \ldots, \lambda_p) + \vec{\varepsilon}_i - \vec{R}_1 - \vec{D}_{12}| + \kappa_{i2}(\mu_1, \mu_2, \ldots, \mu_s) + \zeta_{i2} + \gamma_2 \qquad i = 1, 2, \ldots, k$$

$$\cdots$$

$$t_{Aim} = t_0 + i\delta + \frac{1}{c}|\vec{r}_i + \vec{\beta}_i(\lambda_1, \lambda_2, \ldots, \lambda_p) + \vec{\varepsilon}_i - \vec{R}_1 - \vec{D}_{1m}| + \kappa_{im}(\mu_1, \mu_2, \ldots, \mu_s) + \zeta_{im} + \gamma_m \qquad i = 1, 2, \ldots, k$$

$$\cdots$$

$$t_{AiN} = t_0 + i\delta + \frac{1}{c}|\vec{r}_i + \vec{\beta}_i(\lambda_1, \lambda_2, \ldots, \lambda_p) + \vec{\varepsilon}_i - \vec{R}_1 - \vec{D}_{1N}| + \kappa_{iN}(\mu_1, \mu_2, \ldots, \mu_s) + \zeta_{iN} + \gamma_N \qquad i = 1, 2, \ldots, k$$

FIG. 5

SYSTEM AND METHOD FOR SYNCHRONIZING GROUND CLOCKS

BACKGROUND

It can be difficult to synchronize widely distributed ground clocks. Scientists typically measure the position in space between two ground stations using some variation of the Einstein synchronization protocol, where signals are exchanged between the ground stations to determine the relative synchronization offsets. These methods are in general impractical and prone to errors due to the absence of line of sight between distant ground stations, and due to atmospheric and fiber noise in the communication links.

BRIEF DESCRIPTION OF THE DRAWINGS

Embodiments are illustrated by way of example, and not by way of limitation, in the figures of the accompanying drawings in which like reference numerals refer to similar elements.

FIG. 2 illustrates a method of determining time of arrival at ground stations;

FIG. 3 illustrates another method of determining time of arrival at ground stations;

FIG. 5 illustrates another method of determining time of arrival at ground stations.

BRIEF DESCRIPTION OF THE DRAWINGS

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
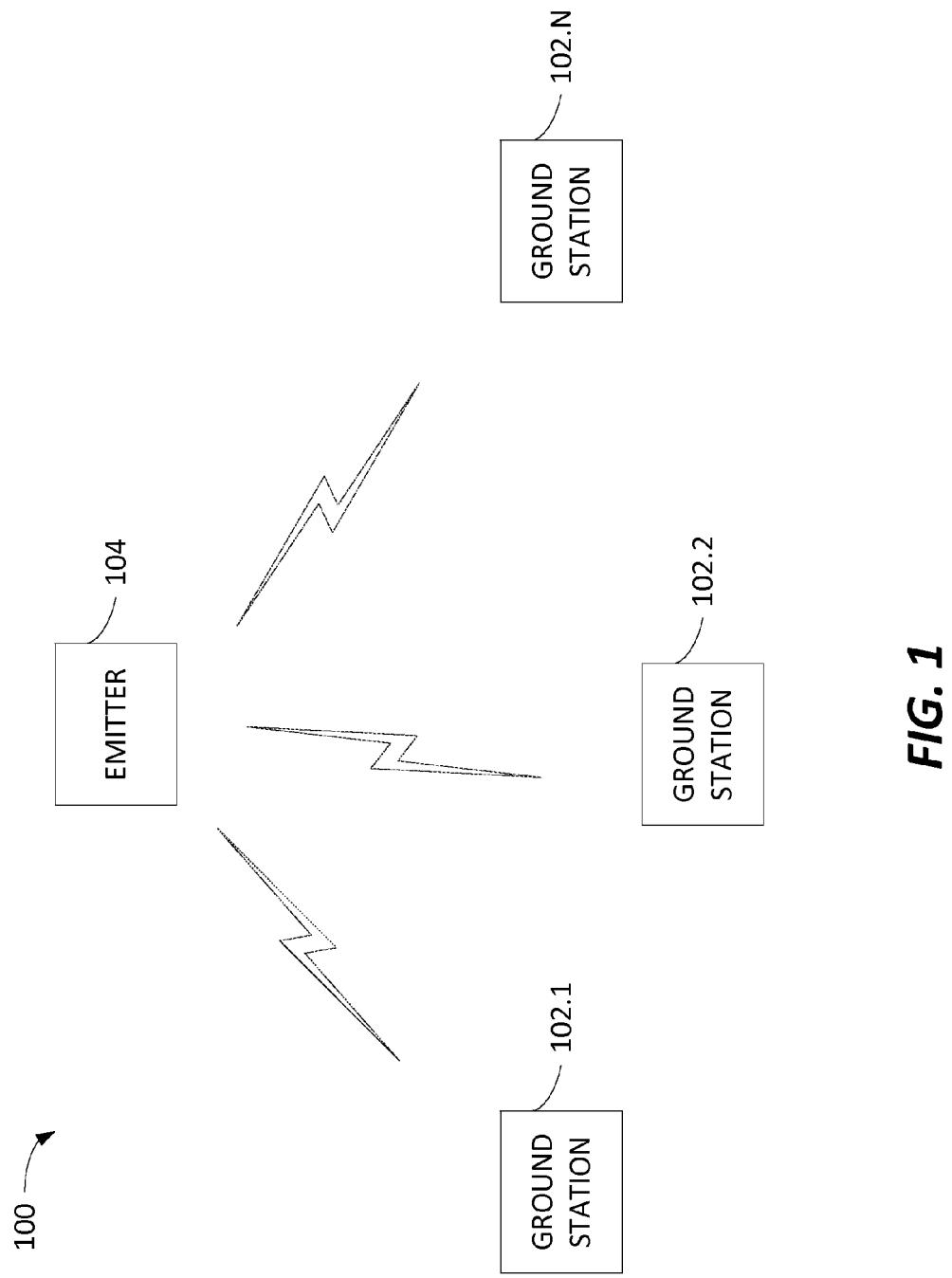
FIG. 1 illustrates a ground clock synchronization system according to one aspect of the present invention.

A system 100 having a plurality of ground stations 102 synchronized via an emitter 104 is shown in FIG. 1. Each ground station 102 includes an accurate clock; each clock is frequency locked (such that phases accumulate at the same rate). A synchronization algorithm is used that relies on fast-moving emitter 104 to send narrow pulses at frequent time intervals which are then received and arrival-time recorded by each of the base stations where the stationary ground clocks are located. No requirements are needed for the emitter's timekeeping; in particular, the emitter does not need to have an accurate clock on board.

In some embodiments, the emitter is an airplane. In others, it is a satellite.

In one embodiment, the synchronization algorithm assumes that there are N−1 unknown (but fixed) synchronization offsets with respect to a station 102.1 that includes the master clock:

$$\Delta T_2 = T_2 - T_1, \ldots, \Delta T_k = T_k - T_1, \ldots, \Delta T_N = T_N - T_1 \quad (1)$$

As noted above, the synchronization technique is based on a fast-moving emitter that sends narrow pulses at frequent time intervals which are then received and arrival-time recorded by each of the base stations. It is assumed that the base stations each have a clock and all clocks are frequency locked (so their phases accumulate at the same rate).

Then with each one i of k time-of-arrival measurements, we have data $t_{Ai1}, t_{Ai2}, \ldots, t_{AiN}$ for the times of arrival at stations $1, \ldots, N$. Let $\vec{R}_1, \vec{R}_2, \ldots, \vec{R}_N$ be the fixed positions of the stations, and let $\vec{r}_i, t_i$ be the position and the emission time (referred to the time of the master clock at station 1) of this i'th time-of-arrival signal. The equations (as shown in FIG. 2) are:

$$\begin{aligned}
t_{Ai1} &= t_i + \frac{1}{c}|\vec{r}_i - \vec{R}_1| & i = 1, 2, \ldots, k \\
t_{Ai2} &= t_i + \frac{1}{c}|\vec{r}_i - \vec{R}_2| + \Delta T_2 & i = 1, 2, \ldots, k \\
&\vdots \\
t_{Aip} &= t_i + \frac{1}{c}|\vec{r}_i - \vec{R}_p| + \Delta T_p & i = 1, 2, \ldots, k \\
&\vdots \\
t_{AiN} &= t_i + \frac{1}{c}|\vec{r}_i - \vec{R}_N| + \Delta T_N & i = 1, 2, \ldots, k
\end{aligned} \quad (2)$$

where c is the speed of light, k is the number of pulses, $\vec{r}_i$ is the position of the emitter at the ith pulse, $\vec{R}_j$ is the position of the jth ground station, and $\Delta T_j$ is the time synch offset between station 1 (the master station) and the jth ground station.

Which means there are a total of Nk equations, and:
- Assuming both the station positions and emitter positions are unknown, there are 4k+(4N−1) unknowns,
- Assuming the station positions are known, but the emitter positions are unknown, there are 4k+(N−1) unknowns,
- Assuming the station positions are unknown and emitter positions are known, there are k+(4N−1) unknowns,
- Assuming both the station positions and emitter positions are known, there are k+(N−1) unknowns.

The first two cases require N≥5, and the last two require only N≥2 for the algorithm to work. In other words, for the algorithm to work, we need to have an over-determined system. The system gets even more over-determined as k gets larger.

Now if we know the baselines $\vec{D}_{1i}$ between the stations i= $2, \ldots, N$ and station 1, we can write $\vec{R}_2 = \vec{R}_1 + \vec{D}_{12}, \ldots, \vec{R}_N = \vec{R}_1 + \vec{D}_{1N}$, and moreover, if we assume that a fixed known proper time δ separates successive timing signals so that $t_i = t_0 + i\delta$, with only one unknown $t_0$, then the above equations can be rewritten (as shown in FIG. 3) as $$t_{Ai1} = t_0 + i\delta + \frac{1}{c}|\vec{r}_i - \vec{R}_1| \qquad i = 1, 2, \ldots, k \quad (3)$$

-continued $$t_{Ai2} = t_0 + i\delta + \frac{1}{c}|\vec{r}_i - \vec{R}_1 - \vec{D}_{12}| + \Delta T_2 \qquad i = 1, 2, \ldots, k$$

$$\vdots \qquad \vdots \qquad \vdots$$

$$t_{Aip} = t_0 + i\delta + \frac{1}{c}|\vec{r}_i - \vec{R}_1 - \vec{D}_{1p}| + \Delta T_p \qquad i = 1, 2, \ldots, k$$

$$\vdots \qquad \vdots \qquad \vdots$$

$$t_{AiN} = t_0 + i\delta + \frac{1}{c}|\vec{r}_i - \vec{R}_1 - \vec{D}_{1N}| + \Delta T_N \qquad i = 1, 2, \ldots, k$$

In this case, if we assume that the emitter positions are known, we have Nk equations and only 4+(N−1) unknowns. If the emitter positions are not known, then we have Nk equations and 4+3k+(N−1) unknowns, requiring only N≥4 (instead of N≥5) for the algorithm to work.

So, for example, assuming both the station positions and emitter positions are unknown (4k+(4N−1) unknowns), or the station positions are known but the emitter positions are unknown (4k+(N−1) unknowns), as long as (N−4)k>(N−1) or as long as (N−4)k>(4N−1), we have an over-determined system of equations that can be solved to obtain accurate estimates of all unknown parameters, including the time offsets and (if necessary) station positions. Quantitatively, nonlinear regression analysis shows that if $\sigma_0$ is the canonical uncertainty (e.g., atmospheric delay, or other noise) in the time of arrival, then the accuracy of the estimates of the time offsets will improve with increasing k according to the expression:

$$\sigma \approx \frac{\sigma_0}{\sqrt{(N-4)k - N + 1}} \qquad (4)$$

or when the station positions are unknown:

$$\sigma \approx \frac{\sigma_0}{\sqrt{(N-4)k - 4N + 1}} \qquad (5)$$

In both cases it is necessary to have N≥5 to ensure an improvement in estimation accuracy of approximately $1/\sqrt{k}$ with increasing k.

Alternatively, in the case the positions $\vec{r}_i$ of the target emitter are known (via, e.g., GPS measurements), we have a total of Nk equations, and k+(N−1) unknowns (assuming the station positions are known), or k+(4N−1) unknowns (if the station positions are not known and have to be solved for).

Therefore as long as (N−1)k>(N−1) and the station positions are known, or as long as (N−1)k>(4N−1), we have an over-determined system of equations that can be solved to obtain accurate estimates of all unknown parameters, including the time offsets and (if necessary) station positions. Quantitatively, nonlinear regression analysis shows that if $\sigma_0$ is the canonical uncertainty (in this case, dominantly the GPS error in to the positioning information of the $\vec{r}_i$) in the time of arrival, then the accuracy of the estimates of the time offsets will improve with increasing k according to the expression:

$$\sigma \approx \frac{\sigma_0}{\sqrt{(N-1)k - N + 1}} \qquad (6)$$

or when the station positions are unknown:

$$\sigma \approx \frac{\sigma_0}{\sqrt{(N-1)k - 4N + 1}} \qquad (7)$$

In both cases it is sufficient to have only N≥2 to ensure an improvement in estimation accuracy of approximately $1/\sqrt{k}$ with increasing k.

Figure 4:
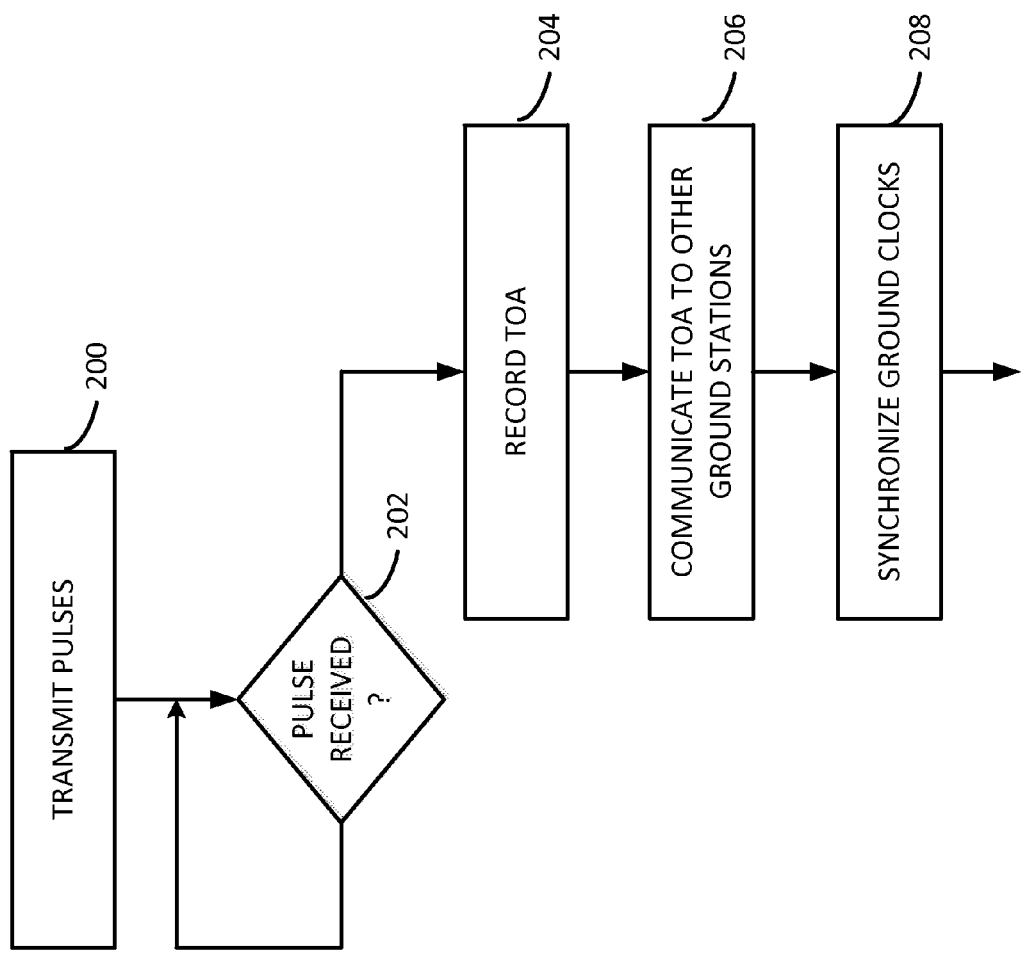
FIG. 4 illustrates a method of synchronizing ground clocks.

A method of synchronizing ground clocks is shown in FIG. 4. In the example embodiment shown in FIG. 4, at 200, emitter 104 transmits a train of pulses. At 202, a check is made at each ground station 102 to determine if a pulse has been received from emitter 104. If not, control stays at 202.

If, however, a check made at each ground station 102 at 202 determines that a pulse has been received from emitter 104, control moves to 204 and the time of arrival (TOA) of the pulse is recorded. At 206, the time of arrival for each pulse is transmitted to each of the other ground stations 102 and, at 208, the accumulated times of arrival are used to synchronize the ground clocks as detailed above.

In some embodiments, emitter 104 transmits a pulse train with a period chosen such that all stations receive the pulse within one period.

In some embodiments, each pulse includes a header used to identify and distinguish the pulse.

As noted above, the ground clocks are frequency locked. In some embodiments, the ground clocks are frequency locked in a natural way by employing exactly the same optical and/or atomic frequency standards to stabilize the local clock oscillators. This way, the laws of physics (along with controlling the ambient environment for the clocks to be the same) guarantee that the nominal clock frequencies at all ground stations remain identical. Alternatively, in some embodiments, for applications that require higher timekeeping accuracy, the ground stations are linked by optical fibers along which frequency stability can be transferred from one station to all others using optical two-way frequency transfer techniques.

In one example embodiment, the ground clocks are based on an ultra-stable frequency reference such as described in U.S. patent application Ser. No. 13/400,348, filed by Wilkinson et al. on Feb. 20, 2012 and issued as U.S. Pat. No. 8,780,948, the description of which is incorporated herein by reference.

In some embodiments, the ultra-stable frequency reference generating system described in U.S. Pat. No. 8,780,948 includes a cavity-stabilized reference laser that includes a laser source locked to a stabilized cavity. In some such embodiments, the system also includes a Rubidium (Rb) cell that may be interrogated by a stabilized laser output of the cavity-stabilized reference laser to cause at least a two-photon Rubidium transition (to an upper state) within the Rubidium cell. A detector detects fluorescence within the Rubidium cell resulting from the spontaneous decay of the upper state Rubidium transition. Other vapor cell references can be used as well.

In vapor cell embodiments, the detector provides a detector output at a wavelength of the fluorescence to lock the cavity-stabilized reference laser to generate a stabilized laser output. In some such embodiments, the laser source is locking to both the stabilized cavity and to the Rubidium transition within the Rubidium cell. The combination of a cavity stabilized laser and femtosecond frequency comb referenced to the 778 nm two-photon transition in Rubidium as a source of ultra-low phase noise optical and microwave frequencies can be used, for instance, as standards in a compact system configuration.

As noted in the patent application, such systems are useful in systems that require synchronization; they are also suitable for use in, for instance, radar systems, communication systems, signal-collection systems and difficult EMI environments.

In some embodiments, we can include five error terms: Modeled ephemeris errors $\vec{\beta}_i(\lambda_1, \lambda_2, \ldots, \lambda_p)$ in the position determination of the emitter at the time of the i'th emission, depending on p unknown ephemeris parameters. Modeled atmospheric delay errors $\kappa_{ij}(\mu_1, \mu_2, \ldots, \mu_s)$ for the time of arrival of the i'th signal to the j'th station (i=1, 2, ..., k, j=1, 2, ..., N), depending on s unknown atmospheric parameters. And three stochastic (fluctuating) un-modeled error terms, un-modeled ephemeris errors $\vec{\epsilon}_i$ in the position of the emitter at the time of the i'th emission, un-modeled (fluctuating) atmospheric delays $\zeta_{ij}$ for the time of arrival of the i'th signal to the j'th station (i=1, 2, ..., k, j=1, 2, ..., N), and un-modeled timing errors $\gamma_j$ due to frequency and phase errors on the clocks themselves (but see below; these can be modeled to some extent just like the ephemeris and delay errors). Then the equations (3) can be re-written as follows:

$$t_{Ai1} = t_0 + i\delta + \frac{1}{c}|\vec{r}_i + \vec{\beta}_i(\lambda_1, \lambda_2, \ldots, \lambda_p) + \qquad i = 1, 2, \ldots, k \quad (8)$$

$$\vec{\epsilon}_i - \vec{R}_1| + \kappa_{i1}(\mu_1, \mu_2, \ldots, \mu_s) + \zeta_{i1} + \gamma_1$$

$$t_{Ai2} = t_0 + i\delta + \frac{1}{c}|\vec{r}_i + \vec{\beta}_i(\lambda_1, \lambda_2, \ldots, \lambda_p) + \qquad i = 1, 2, \ldots, k$$

$$\vec{\epsilon}_i - \vec{R}_1 - \vec{D}_{12}| + \kappa_{i2}(\mu_1, \mu_2, \ldots, \mu_s) + \zeta_{i2} + \gamma_2$$

$$\vdots \qquad \vdots$$

$$t_{Aim} = t_0 + i\delta + \frac{1}{c}|\vec{r}_i + \vec{\beta}_i(\lambda_1, \lambda_2, \ldots, \lambda_p) + \qquad i = 1, 2, \ldots, k$$

$$\vec{\epsilon}_i - \vec{R}_1 - \vec{D}_{1m}| + \kappa_{im}(\mu_1, \mu_2, \ldots, \mu_s) + \zeta_{im} + \gamma_m$$

$$\vdots \qquad \vdots$$

$$t_{AiN} = t_0 + i\delta + \frac{1}{c}|\vec{r}_i + \vec{\beta}_i(\lambda_1, \lambda_2, \ldots, \lambda_p) + \qquad i = 1, 2, \ldots, k$$

$$\vec{\epsilon}_i - \vec{R}_1 - \vec{D}_{1N}| + \kappa_{iN}(\mu_1, \mu_2, \ldots, \mu_s) + \zeta_{iN} + \gamma_N$$

In this case, we have (assuming the emitter positions $\vec{r}_i$ are known) Nk equations and, including the error-model parameters, $4+p+s+(N-1)$ unknowns. Since p and s are fixed small integers, quick convergence is still achievable as $k \to \infty$ for any $N \geq 2$.

The above-described algorithm provides a novel technique to synchronize widely distributed ground clocks using any satellite or aerial platform that has a line of sight connection to all ground stations. The iterative nature of the algorithm combined with rapid optical pulse generation capabilities on the aerial platform will provide better noise reduction potential than state-of-the-art synchronization technologies.

The description and the drawings herein sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

What have been described above are new systems and methods for synchronizing ground clocks. These methods can be used to sense range between platforms, to determine relative velocities, and to determine gravitational potential difference in ways that are useful for navigation applications.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the system may include one or more processors and may be configured with instructions stored on a computer-readable storage device.

What is claimed is:

1. A method of synchronizing a plurality of frequency-locked clocks, the method comprising:
   transmitting a train of pulses from a satellite-based or aerial fast moving emitter to each of a plurality of stationary base stations in line-of-sight communication with the emitter, the train of pulses being periodic and having a period such that the base stations receive each pulse within a single period, the base stations including respective frequency-locked clocks, the frequency-locked clocks having frequencies determined by a common atomic transition;
   receiving the pulses at each base station;
   recording a time of arrival for each pulse received by each base station;
   communicating the recorded times of arrival to a processor;
   calculating, with the processor, a synchronization offset for each frequency-locked clock, as a function of:
     the time of arrival for each pulse at each base station,
     a position of the emitter when transmitting each pulse, and
     a position of each base station; and
   synchronizing the frequency-locked clocks in response to the calculated synchronization offsets.

2. The method of claim 1, wherein each pulse includes a pulse identifier and wherein recording the time of arrival includes recording the pulse identifier.

3. The method of claim 1, wherein:
   the plurality of base stations includes at least N base stations, N being an integer greater than 1; and
   transmitting the train of pulses includes transmitting k pulses, k being an integer greater than 1.

4. The method of claim 3, wherein, when the base station and emitter positions are unknown, N and k are selected to overdetermine a system of $4k+(4N-1)$ unknowns.

5. The method of claim 3, wherein, when the base station positions are unknown but the emitter positions are known, N and k are selected to overdetermine a system of $k+(4N-1)$ unknowns.

6. The method of claim 3, wherein, when the base station positions are known but the emitter positions are unknown, N and k are selected to overdetermine a system of $4k+(N-1)$ unknowns.

7. The method of claim 3, wherein, when the base station positions are known and the emitter positions are known, N and k are selected to overdetermine a system of $k+(N-1)$ unknowns.

8. The method of claim 3, wherein a fixed known time separates successive pulses; wherein a known baseline exists between a first base station and each of the other base stations, and wherein the emitter positions are known, N and k are selected to overdetermine a system of 4+(N−1) unknowns.

9. The method of claim 3, wherein a fixed known time separates successive pulses; wherein a known baseline exists between a first base station and each of the other base stations, and wherein the emitter positions are known, N and k are selected to overdetermine a system of 4+3k+(N−1) unknowns.

10. The method of claim 3, wherein calculating the synchronization offset for each base station includes correcting for an ephemeris error in determination of the emitter position at the time it transmitted each pulse.

11. The method of claim 3, wherein calculating the synchronization offset for each base station includes correcting for an atmospheric delay error in determining time of arrival of a pulse at a base station.

12. The method of claim 3, wherein calculating the synchronization offset for each base station includes correcting for a timing error introduced by one or more of the base station clocks.

13. A method of synchronizing a plurality of frequency-locked clocks within a system having a plurality of base stations, including a first base station, wherein each base station includes a frequency-locked clock, the frequency-locked clocks having frequencies determined by a common atomic transition, the method comprising:
   receiving at the first base station, k pulses transmitted from a satellite-based or aerial fast moving emitter in line-of-sight communication with each of the plurality of base stations, k being an integer greater than 1;
   recording a time of arrival for each pulse received by the first base station;
   communicating the recorded times of arrival to a processor;
   receiving, at the processor, recorded times of arrival for each of the k pulses from each of the other base stations;
   calculating, with the processor, a synchronization offset for each frequency-locked clock, as a function of:
      the time of arrival for each of the k pulses at each base station,
      a position of the emitter when transmitting each of the k pulses, and
      a position of each base station; and
   synchronizing the frequency-locked clock of the first base station to a master clock in response to the calculated synchronization offsets.

14. The method of claim 13, wherein the plurality of base stations includes at least N base stations, N being an integer greater than 1.

15. A non-transitory computer readable medium comprising a plurality of instructions that, in response to being executed on a computing device, cause the computing device to carry out a method for synchronizing a plurality of frequency-locked clocks within a system having a plurality of base stations, including a first base station, wherein each base station includes a frequency-locked clock, the frequency-locked clocks having frequencies determined by a common atomic transition, the method comprising:
   receiving at the first base station, k pulses transmitted from a satellite-based or aerial fast moving emitter in line-of-sight communication with each of the plurality of base stations, k being an integer greater than 1;
   recording a time of arrival for each pulse received by the first base station;
   communicating the recorded times of arrival to a processor of the computing device;
   receiving, at the processor, recorded times of arrival for each of the k pulses from each of the other base stations;
   calculating, with the processor, a synchronization offset for each frequency-locked clock, as a function of:
      the time of arrival for each of the k pulses at each base station,
      a position of the emitter when transmitting each of the k pulses, and
   a position of each base station; and
   synchronizing the frequency-locked clock of the first base station to a master clock in response to the calculated synchronization offsets.

16. A system, comprising:
   a satellite-based or aerial fast moving emitter configured to transmit a train of pulses, the train of pulses being periodic and having a period; and
   a plurality of stationary base stations in line-of-sight communication with the emitter and configured to receive the train of pulses, each base station including a frequency-locked clock, the frequency-locked clocks having frequencies determined by a common atomic transition; each base station configured to record respective times of arrival of the pulses; and
   a processor configured to:
      receive the recorded times of arrival for each of the pulses from each of the base stations;
      calculate a synchronization offset for each frequency-locked clock, as a function of:
         the time of arrival for each of the pulses at each base station,
         a position of the emitter when transmitting each of the pulses, and
         a position of each base station; and
      synchronize the frequency-locked clocks in response to the calculated synchronization offsets.

17. The system of claim 16, wherein the pulses include a pulse identifier.

18. The system of claim 16, wherein phases of the frequency-locked clocks accumulate at approximately the same rate.

* * * * *